US006372849B2

(12) United States Patent
DeMoss et al.

(10) Patent No.: US 6,372,849 B2
(45) Date of Patent: Apr. 16, 2002

(54) SEALANTS AND POTTING FORMULATIONS INCLUDING POLYMERS PRODUCED BY THE REACTION OF A POLYTHIOL AND POLYVINYL ETHER MONOMER

(75) Inventors: Susan E. DeMoss, Van Nuys; Chandra B. Rao, Valencia; Ahmed Sharaby, Canyon Country; Hakam Singh, Bradbury; Jonathan D. Zook, Santa Clarita; David W. Jordan, Northridge, all of CA (US)

(73) Assignee: PRC-DeSoto International, Inc., Glendale, CA (US)

( * ) Notice: Subject to any disclaimer, the term of this patent is extended or adjusted under 35 U.S.C. 154(b) by 0 days.

(21) Appl. No.: 09/756,080

(22) Filed: Jan. 8, 2001

Related U.S. Application Data

(60) Continuation-in-part of application No. 08/928,972, filed on Sep. 12, 1997, now Pat. No. 6,172,179, which is a continuation-in-part of application No. 08/802,130, filed on Feb. 19, 1997, now Pat. No. 5,912,319, application No. 09/756,080, which is a continuation-in-part of application No. 09/318,500, filed on May 25, 1999, now Pat. No. 6,232,401, which is a division of application No. 08/802,130.
(60) Provisional application No. 60/182,396, filed on Feb. 14, 2000, and provisional application No. 60/215,548, filed on Jun. 30, 2000.

(51) Int. Cl.$^7$ ............................ C08L 33/14; C08L 41/00
(52) U.S. Cl. .................. 525/212; 525/191; 528/373; 528/374; 528/378
(58) Field of Search .................. 525/212, 191; 528/373, 374, 378

(56) References Cited

U.S. PATENT DOCUMENTS

| | | |
|---|---|---|
| 3,506,626 A | 4/1970 | Warner et al. |
| 3,697,402 A | 10/1972 | Kehr et al. |
| 3,697,622 A * | 10/1972 | Kethr et al. ............. 528/373 |
| 3,725,229 A | 4/1973 | Kehr et al. |
| 3,734,968 A | 5/1973 | Hickner |
| 4,366,307 A | 12/1982 | Singh et al. |
| 4,609,762 A | 9/1986 | Morris et al. |
| 5,225,472 A | 7/1993 | Cameron et al. |
| 5,516,455 A | 5/1996 | Jacobine et al. |
| 5,912,319 A | 6/1999 | Zook et al. |
| 6,172,179 B1 | 1/2001 | Zook et al. |

OTHER PUBLICATIONS

Klemm, E. et al., 1991, J. Macromol. Sci–Chem, A28(9), 875–883.
Nuyken, O. et al., 1990, Makromol, Chem., Rapid Commun. 11, 365–373.
Ameduri, B. et al., 1991, Polymer Bulletin 26, 377–382.
Klemm, E. et al., 1985, Chemical Abstracts 103:197058z.
Yamaguchi, K. et al., 1973, Polymer, 14:87–90.
Marvel, C. et al., J. Pol. Sci., 6(6):711–716.
Marvel, C. et al., J. Pol. Sci., 8(3):313–320.
Cai, G. et al., Synthesis of Polythioether Ethers from Diallyl Ether.
Nuyken, O. et al., 1991, Makromol. Chem. 192, 1959–1968.
Nuyken, O. et al., 1981, Polymer Bulletin 4, 61–65.
Chemical Abstracts Selects: 1992, Novel Polymers from Patents, Issue 7, 116:107048n; 1970, Warner et al., Organic Sulfur Polymers,112186x.
Abstract of U.S. Patent No. 2,664,414, Dec. 29, 1953.
Klemm, E. et al., 1987, Chem., 27Jg, 4:145–146.
Klemm, E. et al., 1992, Polymer Bulletin 28, 653–656.
Nuyken, O. et al., 1984, Polymer Bulleltin 11, 165–170.
Organic Sulfur Chemistry: Structure & Mechanism, 408–410 and 418.
Klemm, E. et al., 1990, Makromol. Chem. 191, 2403–2411.
Nuyken, O. et al., "Dimercapto Telechelics by Polyaddition of Diothiols onto Diolefines", 197–198.
Musorin, G.K., et al., 1991, "A simple Synthesis of 2–Methyl–1, 4–Dithiacycloheptane from diallyl Sulfide and Hydrogen Sulfide," Plenum Publishing Corporation, 2423.
Haucourt, Nancy H., 1994, Macromolecules, 27:1329–1333.

* cited by examiner

*Primary Examiner*—Duc Truong
(74) *Attorney, Agent, or Firm*—Finnegan, Henderson, Farabow, Garrett & Dunner, L.L.P.

(57) ABSTRACT

Sealant and potting formulations are provided which includes ungelled polymer(s) prepared from components including polyvinyl ether monomer(s) and polythiol material(s), the ungelled polymer being terminated with functional groups other than a thiol group; curing agent(s); and at least one additive selected from the group consisting of fillers, adhesion promoters, plasticizers and catalysts.

21 Claims, No Drawings

SEALANTS AND POTTING FORMULATIONS INCLUDING POLYMERS PRODUCED BY THE REACTION OF A POLYTHIOL AND POLYVINYL ETHER MONOMER

CROSS-REFERENCE TO RELATED APPLICATIONS

This application is a continuation-in-part of U.S. patent application Ser. No. 08/928,972 filed Sep. 12, 1997 now U.S. Pat. No. 6,172,179, which is a continuation-in-part of Ser. No. 08/802,130, filed Feb. 19, 1997, now U.S. Pat. No. 5,912,319. Also, this application is a continuation-in-part of U.S. patent application Ser. No. 09/318,500 filed May 25, 1999, now U.S. Pat. No. 6,232,401, which is a division of Ser. No. 08/802,130, filed Feb. 19, 1997, now U.S. Pat. No. 5,912,319. This application also claims the benefit of U.S. provisional application No. 60/182,396 filed Feb. 14, 2000 and U.S. provisional application No. 60/215,548 filed Jun. 30, 2000.

FIELD OF THE INVENTION

The present invention relates to a sealant or potting formulation prepared from a polymer produced by the reaction of polythiol(s) and polyvinyl ether monomer(s) and being terminated with at least one reactive functional group other than a mercapto group, the formulation having good low temperature flexibility and fuel resistance.

BACKGROUND OF THE INVENTION

Commercially available polymeric materials which have sufficient sulfur content to exhibit desirable sealing and fuel resistance properties for aerospace sealants and electrical potting compounds are the polysulfide polyformal polymers described, e.g., in U.S. Pat. No. 2,466,963, and the alkyl side chain containing polythioether polyether polymers described, e.g., in U.S. Pat. No. 4,366,307 to Singh et al. Materials useful in this context also have the desirable properties of low temperature flexibility characterized by a low glass transition temperature ($T_g$) and liquidity at room temperature.

An additional desirable combination of properties for aerospace sealants which is much more difficult to obtain is the combination of long application time (i.e., the time during which the sealant remains usable) and short curing time (the time required to reach a predetermined strength). Singh et al., U.S. Pat. No. 4,366,307, disclose such materials. Singh et al. teach the acid-catalyzed condensation of hydroxyl-functional thioethers. The hydroxyl groups are in the β-position with respect to a sulfur atom for increased condensation reactivity. The Singh et al. patent also teaches the use of such hydroxyl-functional thioethers with pendant methyl groups to afford polymers having good flexibility and liquidity. However, the disclosed condensation reaction has a maximum yield of about 75% of the desired condensation product. Furthermore, the acid-catalyzed reaction of β-hydroxysulfide monomers yields significant quantities of an aqueous solution of thermally stable and highly malodorous cyclic byproducts, such as 1-thia-4-oxa-cyclohexane which limits the suitable application of the disclosed polymers.

Another desirable feature in polymers suitable for use in aerospace sealants is high temperature resistance. While incorporating sulfur to carbon bonds into a polymer generally enhances high temperature performance, the polysulfide polyformal polymers disclosed in U.S. Pat. No. 2,466,963 have multiple —S—S— linkages in the polymer backbones which result in compromised thermal resistance. In the polymers of Singh et al., U.S. Pat. No. 4,366,307, enhanced thermal stability is achieved through replacement of polysulfide linkages with polythioether (—S—) linkages. However, the thermal resistance of these polythioethers is limited as a result of residual acid condensation catalyst.

Morris et al., U.S. Pat. No. 4,609,762, describes reacting dithiols with secondary or tertiary alcohols to afford liquid polythioethers having no oxygen in the polymeric backbone. Cured polymeric materials formed from these polymers have the disadvantage, however, of reduced fuel resistance due to the large number of pendant methyl groups that are present. In addition, the disclosed process generates undesirable aqueous acidic waste.

Cameron, U.S. Pat. No. 5,225,472, discloses production of polythioether polymers by the acid-catalyzed condensation of dithiols with active carbonyl compounds such as HCOOH. Again, this process generates undesirable aqueous acidic waste.

The addition polymerization of aromatic or aliphatic dithiols with diene monomers has been described in the literature. See, e.g., Klemm, E. et al., *J. Macromol. Sci.-Chem.*, A28(9), pp. 875–883 (1991); Nuyken, O. et al., *Makromol. Chem., Rapid Commun.* 11, 365–373 (1990). However, neither Klemm et al. nor Nuyken suggest selection of particular starting materials to form a polymer that is liquid at room temperature and, upon curing, has excellent low-temperature flexibility (low $T_g$) and high resistance to fuels, i.e., hydrocarbon fluids. Nor do Klemm et al. suggest production of a polymer that also is curable at room or lower temperatures. Moreover, the reactions disclosed by Klemm et al. also generate undesirable cyclic byproducts.

There exists a need in the art for sealant, coating and electrical potting formulations or compositions which can provide good pot life as well as good performance properties, such as fuel resistance, flexural strength, thermal resistance and longevity in use.

SUMMARY OF THE INVENTION

The present invention relates to sealant and electrical potting formulations prepared from components comprising: (a) at least one ungelled polymer prepared by reacting reactants comprising at least one polyvinyl ether monomer and at least one polythiol material, the ungelled polymer being terminated with functional groups other than a thiol group; (b) at least one curing agent reactive with the functional group of (a); and (c) at least one additive selected from the group consisting of fillers, adhesion promoters, plasticizers and catalysts.

Another aspect of the present invention is a sealant formulation prepared from components comprising: (a) at least one ungelled polymer prepared by reacting reactants comprising diethylene glycol divinyl ether and dimercapto dioxaoctane, the ungelled polymer being terminated with functional groups other than a thiol group; (b) at least one curing agent reactive with the reactive functional group of (a); and (c) at least one additive selected from the group consisting of fillers, adhesion promoters, plasticizers and catalysts.

Other than in the operating examples, or where otherwise indicated, all numbers expressing quantities of ingredients, reaction conditions, and so forth used in the specification and claims are to be understood as being qualified in all instances by the term "about". Also, as used herein, the term "polymer" is meant to refer to oligomers, homopolymers and copolymers.

DETAILED DESCRIPTION OF THE PREFERRED EMBODIMENTS

The sealant and potting formulations of the present invention comprise one or more ungelled polymers prepared from reactants comprising at least one polyvinyl ether monomer and at least one polythiol material, the ungelled polymer being terminated with functional groups other than a thiol group. It has surprisingly been discovered that polythioethers prepared from the combination of polythiol(s) with polyvinyl ether monomer(s) according to the present invention results in ungelled polymers that are liquid at room temperature and pressure and that have desirable physical and rheological properties, and that furthermore are substantially free of malodorous cyclic by-products. The inventive materials also are substantially free of deleterious catalyst residues, and can have superior thermal resistance properties.

The ungelled polymers useful in the sealant and potting formulations of the present invention are preferably liquid at room temperature and pressure and cured sealants including such polymers have excellent low temperature flexibility and fuel resistance. As used herein, the term "room temperature and pressure" denotes conditions of approximately 77° F. (25° C.) and 1 atmosphere (760 mm Hg) pressure.

By "ungelled" is meant that the ungelled polymer is substantially free of crosslinking and has an intrinsic viscosity when dissolved in a suitable solvent, as determined, for example, in accordance with ASTM-D1795 or ASTM-D4243. The intrinsic viscosity of the ungelled polymer is an indication of its finite molecular weight. A gelled reaction product, on the other hand, since it is of essentially infinitely high molecular weight, will have an intrinsic viscosity too high to measure.

Preferably, the ungelled polymer has a glass transition temperature ($T_g$) that is not higher than −50° C., more preferably not higher than −55° C. and most preferably not higher than −60° C. Generally, it is preferred that the glass transition temperature of the ungelled polymer ranges from −85° C. to −50° C., and more preferably −70° C. to −50° C., as determined by differential scanning calorimetry (DSC).

Low temperature flexibility can be determined by known methods, for example, by the methods described in AMS (Aerospace Material Specification) 3267 §4.5.4.7, MIL-S (Military Specification)-8802E §3.3.12 and MIL-S-29574, and by methods similar to those described in ASTM (American Society for Testing and Materials) D522-88, which are incorporated herein by reference. Cured formulations having good low temperature flexibility are desirable in aerospace applications because the formulations are subjected to wide variations in environmental conditions, such as temperature and pressure, and physical conditions such as joint contraction and expansion and vibration.

An advantage of the formulations of the present invention is that they exhibit very desirable fuel resistance characteristics when cured, due at least in part to the use of the ungelled polymers discussed herein. The fuel resistance of a cured sealant can be determined by percent volume swell after prolonged exposure of the cured sealant to a hydrocarbon fuel, which can be quantitatively determined using methods similar to those described in ASTM D792 or AMS 3269, which are incorporated herein by reference. For fuel resistance testing, the cured sealant can be prepared from 100 parts by weight of ungelled polymer containing functional groups other than thiol such as an amine group or a hydroxyl group, 50 parts by weight of precipitated calcium carbonate and a curing agent, for example an epoxy curing agent for the amine functional polymer or a polyisocyanate for the hydroxyl functional polymer, in a 1:1 equivalent ratio of functional groups to coreactive functional groups. For the epoxy curing agent, one prepared from a 60:40 weight ratio of EPON 828 bisphenol A diglycidyl ether (available from Shell Chemical) to DEN 431 bisphenol A novolac resin (available from Dow Chemical) can be used.

In a preferred embodiment, the cured sealants of the present invention have a percent volume swell not greater than 40%, and preferably not greater than 25% after immersion for one week at 140° F. (60° C.) and ambient pressure in jet reference fluid (JRF) type 1. More preferably, the percent volume swell of the cured polymers is not greater than 20%, and more preferably ranges from zero to 20%. Jet reference fluid JRF type 1, as employed herein for determination of fuel resistance, has the following composition (see AMS 2629, issued Jul. 1, 1989), §3.1.1 et seq., available from SAE (Society of Automotive Engineers, Warrendale, Pa.) (which is incorporated herein by reference):

| | |
|---|---|
| Toluene | 28 ± 1% by volume |
| Cyclohexane (technical) | 34 ± 1% by volume |
| Isooctane | 38 ± 1% by volume |
| Tertiary dibutyl disulfide (doctor sweet) | 1 ± 0.005% by volume |
| Tertiary butyl mercaptan | 0.015% ± 0.0015 by weight of the other four components |

Preferably, the ungelled polymer has a number average molecular weight ranging from about 500 to about 20,000 grams per mole, more preferably from about 1,000 to about 10,000, and most preferably from about 2,000 to about 5,000, the molecular weight being determined by gel-permeation chromatography using a polystyrene standard.

Liquid ungelled polymers within the scope of the present invention can be difunctional, that is, linear polymers having two end groups, or polyfunctional, that is, branched polymers having three or more end groups.

The ungelled polymers are prepared by reacting reactants comprising one or more polyvinyl ether monomers and one or more polythiol materials. The ungelled polymer has one or more reactive functional groups other than a polythiol group, such as hydroxyl, amino, and/or vinyl groups.

Useful polyvinyl ether monomers include divinyl ethers having the formula (V):

$$CH_2=CH-O-(-R^2-O-)_m-CH=CH_2 \qquad (V)$$

where $R^2$ is $C_{2-6}$ n-alkylene, $C_{2-6}$ branched alkylene, $C_{6-8}$ cycloalkylene or $C_{6-10}$ alkylcycloalkylene group or $-[(CH_2-)_p-O-]_q-(-CH_2-)_r-$ and m is a rational number ranging from 0 to 10, p is an independently selected integer ranging from 2 to 6, q is an independently selected integer ranging from 1 to 5 and r is an independently selected integer ranging from 2 to 10.

The materials of formula V are divinyl ethers. Such divinyl ether monomers as described herein can provide polymers having superior fuel resistance and low temperature performance as compared to prior art polymers prepared from alkenyl ether and conjugated dienes such as 1,3 butadiene copolymerized with a dithiol such as DMDS. Divinyl ether (m=0) is operative herein. Preferred divinyl ethers include those compounds having at least one oxyalkylene group, more preferably from 1 to 4 oxyalkylene groups such as those compounds in which m is an integer from 1 to 4. More preferably, m is an integer from 2 to 4. It is also possible to employ commercially available divinyl ether mixtures in producing ungelled polymers according to the invention. Such mixtures are characterized by a non-integral average value for the number of alkoxy units per molecule. Thus, m in formula V can also take on rational number values between 0 and 10.0; preferably between 1.0 and 10.0; very preferably between 1.0 and 4.0, particularly between 2.0 and 4.0.

Suitable polyvinyl ether monomers include divinyl ether monomers, such as divinyl ether, ethylene glycol divinyl ether (EG-DVE) ($R^2$=ethylene, m=1), butanediol divinyl ether (BD-DVE) ($R^2$=butylene, m=1), hexanediol divinyl ether (HD-DVE) ($R^2$=hexylene, m=1), diethylene glycol divinyl ether (DEG-DVE) ($R^2$=ethylene, m=2) (preferred), triethylene glycol divinyl ether ($R^2$=ethylene, m=3), tetraethylene glycol divinyl ether ($R^2$=ethylene, m=4), cyclohexanedimethanol divinyl ether, polytetrahydrofuryl divinyl ether; trivinyl ether monomers such as trimethylolpropane trivinyl ether, tetrafunctional monomers such as pentaerythritol tetravinyl ether and mixtures thereof. The polyvinyl ether material can have one or more pendant groups selected from alkyl groups and alkoxy groups.

Useful divinyl ethers in which $R^2$ is $C_{2-6}$ branched alkylene can be prepared by reacting a polyhydroxy compound with acetylene. Exemplary compounds of this type include compounds in which $R^2$ is an alkyl-substituted methylene group such as —CH(CH$_3$)— (for example "PLURIOL®" blends such as PLURIOL® E-200 divinyl ether (BASF Corp. of Parsippany, N.J.), for which $R^2$=ethylene and m=3.8) or an alkyl-substituted ethylene (for example —CH$_2$CH(CH$_3$)— such as "DPE" polymeric blends including DPE-2 and DPE-3 (International Specialty Products of Wayne, N.J.)).

Other useful divinyl ethers include fluorinated compounds or compounds in which $R^2$ is polytetrahydrofuryl (poly-THF) or polyoxyalkylene, preferably having an average of about 3 monomer units.

Two or more polyvinyl ether monomers of the formula V can be used in the foregoing method. Thus in preferred embodiments of the invention, two polythiols of formula IV (discussed below) and one polyvinyl ether monomer of formula V, one polythiol of formula IV and two polyvinyl ether monomers of formula V, two polythiols of formula IV and two polyvinyl ether monomers of formula V, and more than two compounds of one or both formulas, can be used to produce a variety of polymers according to the invention, and all such combinations of compounds are contemplated as being within the scope of the invention.

Generally, the polyvinyl ether monomer comprises greater than 50 mole percent of the reactants used to prepare the ungelled polymer.

Suitable polythiol materials for preparing the ungelled polymer include compounds, monomers or polymers having at least two thiol groups. Useful polythiols include dithiols having the formula (IV):

HS—$R^1$—SH                              (IV)

where $R^1$ can be a $C_{2-6}$ n-alkylene group; $C_{3-6}$ branched alkylene group, having one or more pendant groups which can be, for example, hydroxyl groups, alkyl groups such as methyl or ethyl groups; alkoxy groups, $C_{6-8}$ cycloalkylene; $C_{6-10}$ alkylcycloalkylene group; —[(—CH$_2$—)$_p$—X]$_q$—(—CH$_2$)$_r$—; or —[(—CH$_2$)$_p$—X]$_q$—(—CH$_2$)$_r$— in which at least one —CH$_2$— unit is substituted with a methyl group and in which p is an independently selected integer ranging from 2 to 6, q is an independently selected integer ranging from 1 to 5 and r is an independently selected integer ranging from 2 to 10.

Further preferred dithiols include one or more heteroatom substituents in the carbon backbone, that is, dithiols in which X includes a heteroatom such as O, S or another bivalent heteroatom radical; a secondary or tertiary amine group, i.e., —NR$^6$—, where R$^6$ is hydrogen or methyl; or another substituted trivalent heteroatom. In a preferred embodiment, X is O or S, and thus $R^1$ is —[(—CH$_2$—)$_p$— —]$_q$—(—CH$_2$—)$_r$— or —[(—CH$_2$—)$_p$—S—]$_q$—(—CH$_2$—)$_r$—. Preferably, p and r are equal, and most preferably both have the value of 2.

Useful polythiols include but are not limited to dithiols such as 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane and mixtures thereof. The polythiol material can have one or more pendant groups selected from lower alkyl groups, lower alkoxy groups and hydroxyl groups. Suitable alkyl pendant groups include $C_1$–$C_6$ linear alkyl, $C_3$–$C_6$ branched alkyl, cyclopentyl, and cyclohexyl.

Preferred dithiols include dimercaptodiethylsulfide (DMDS) (p=2, r=2, q=1, X=S); dimercaptodioxaoctane (DMDO) (p=2, q=2, r=2, X=O); and 1,5-dimercapto-3-oxapentane (p=2, r=2, q=1, X=O). It is also possible to use dithiols that include both heteroatom substituents in the carbon backbone and pendant alkyl groups, such as methyl groups. Such compounds include methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS such as HS—CH$_2$CH(CH$_3$)—S—CH(CH$_3$) CH$_2$—SH and HS—CH(CH$_3$)CH$_2$—S—CH$_2$CH(CH$_3$)—SH.

Two or more different polythiols can be used if desired to prepare useful polythioethers.

Preferably, the polythiol material has a number average molecular weight ranging from 90 to 1000 grams per mole, and more preferably 90 to 500 grams per mole.

Relative amounts of dithiol and divinyl ether materials used to prepare the polymers can be chosen to yield reactive functional groups such as terminal vinyl groups that further can be reacted to provide other reactive functional groups such as hydroxyl groups or amino groups in a manner discussed below. Preferably, the equivalent ratio of divinyl to polythiol compounds is greater than 1:1 (i.e. greater than 50 mole percent, with the thiol material preferably being less than 50 mole percent), resulting in a vinyl-terminated polymer that can be reacted to incorporate other functional groups, such as hydroxyl, amino, and/or epoxy.

Hydroxyl- or amino-functional terminal polymers can be produced, for example, by reacting a vinyl terminated material with mercaptoalcohols such as 3-mercaptopropanol or mercaptoamines such as 4-mercaptobutylamine, respectively.

Preferably, the ungelled polymer comprises 30 to 90 weight percent of the sealant formulation on a basis of total weight of the sealant formulation, and more preferably 30 to 60 weight percent.

The reactants from which the ungelled polymers are prepared can further comprise one or more free radical catalysts. Preferred free radical catalysts include azo compounds, for example azobis-nitrile compounds such as azo(bis)isobutyronitrile (AIBN); organic peroxides such as benzoyl peroxide and t-butyl peroxide; inorganic peroxides and similar free-radical generators. The reaction can also be effected by irradiation with ultraviolet light either with or without a cationic photoinitiating moiety. Ionic catalysis methods, using either inorganic or organic bases, e.g., triethylamine, also yield materials useful in the context of this invention.

Ungelled polymers within the scope of the present invention can be prepared by a number of methods. According to a first preferred method, a material having the formula IV:

or a mixture of at least two different compounds having the formula IV, are reacted with a material having the formula V:

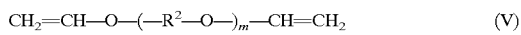

or a mixture of at least two different compounds having the formula V, in the presence of a catalyst in a $CH_2=CH-/-SH$ equivalent ratio greater than 1. This method provides an uncapped, vinyl-terminated difunctional polymer.

According to a preferred embodiment, a difunctional vinyl-terminated polymer is prepared. Thus, the polythioether has the following structure:

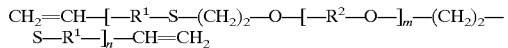

In a preferred embodiment, $R^1=-[(-CH_2)_p-X]_q-(-CH_2)_r-$, where p=2, X=O, q=2 and r=2, $R^2$ is ethylene group, m=2 and n is about 9.

The foregoing polymers are produced, for example, by reacting a stoichiometric excess of divinyl ether or mixture thereof with dithiol or mixture thereof, as discussed in detail below.

Preferably, the ungelled polymers are essentially free of sulfone, ester or disulfide linkages, and more preferably free of such linkages. The absence of these linkages can provide good fuel and temperature resistance and good hydrolytic stability. As used herein, "essentially free of sulfone, ester or disulfide linkages" means that less than 2 mole percent of the linkages in the ungelled polymer are sulfone, ester or disulfide linkages. Disulfide linkages are particularly susceptible to thermal degradation, sulfone linkages are particularly susceptible to hydrolytic degradation.

Besides vinyl groups, the ungelled polymer can contain other functional groups which can be prepared by reacting the vinyl terminated polymers with one or more functionalizing agents.

The term "functionalizing agent" as employed herein denotes a compound having one moiety that is reactive with $-CH=CH_2$ groups and one moiety that contains at least one functional group such as hydroxyl and amino, that is not reactive or is comparatively less reactive with $-CH=CH_2$ groups.

Inventive polymers as described above have a wide range of average functionality. For example, functionalizing agents can be chosen to give average functionalities from about 2.05 to 3.0, preferably about 2.1 to 2.6. Wider ranges of average functionality can be achieved by using tetrafunctional or higher functionality. The functionalizing agent can be reacted with the vinyl terminated polymer. Typically, the reaction product is prepared in one step. The polyvinyl monomer, polythiol and functionalizing agent are reacted together, with this stoichiometry and reaction conditions being controlled, so as to obtain an ungelled polymer with the desired functionality and molecular weight.

Preferably, the ungelled polymer has a viscosity of less than about 500 poise at a temperature of about 25° C. and a pressure of about 760 mm Hg determined according to ASTM D-2849 para. 79–90 using a Brookfield viscometer.

The ungelled polymer or combination of ungelled polymers as detailed herein preferably is present in the polymerizable sealant composition in an amount from about 30 wt % to about 90 wt %, more preferably about 40 to about 80 wt %, very preferably about 45 to about 75 wt %, with the wt % being calculated based on the weight of total solids of the composition.

The sealant or potting formulations of the present invention further comprise one or more curing agents that contain reactive functional groups that are reactive with the functional groups associated with the ungelled polymer. Useful curing agents include polythiols, such as those mentioned above, for the vinyl terminated ungelled polymers; polyisocyanates such as isophorone, diisocyanate, and hexamethylene diisocyanate including mixtures thereof and including isocyanurate derivatives thereof, and polyepoxides for amine terminated ungelled polymers. Examples of polyepoxides include hydantoin diepoxide, bisphenol-A epoxides, bisphenol-F epoxides, novolac type epoxides, aliphatic polyepoxides, and any of the epoxidized unsaturated and phenolic resins.

Depending on the nature of the ungelled polymer(s) used in the composition, the equivalent ratio of curing agent to ungelled polymer can be from 0.05–1.5/1, preferably 0.1–1/1.

Fillers useful in the polymerizable compositions of the invention for aerospace application include those commonly used in the art, such as carbon black and calcium carbonate ($CaCO_3$). Potting compound fillers illustratively include high band gap materials such as zinc sulfide and inorganic barium compounds. Preferably, the compositions include about 10 to about 70 wt % of the selected filler or combination of fillers, more preferably about 10 to 50 wt % based upon the total weight of the composition.

The sealant and potting compositions of the present invention can comprise one or more adhesion promoters. Suitable adhesion promoters include phenolics such as METHYLON phenolic resin available from Occidental Chemicals, organosilanes such as epoxy, mercapto or amino functional silanes such as A-187 and A-1100 available from OSi Specialities. Preferably, an adhesion promoter is employed in an amount from 0.1 to 15 wt % based upon total weight of the formulation.

Common substrates to which the sealant compositions of the present invention are applied can include titanium, stainless steel, aluminum, anodized, primed, organic coated and chromate coated forms thereof, epoxy, urethane, graphite, fiberglass composite, KEVLAR®, acrylics and polycarbonates.

Preferably, a plasticizer is present in the sealant formulation in an amount ranging from 1 to 8 weight percent based upon total weight of the formulation. Plasticizers that are useful in polymerizable compositions of the invention include phthalate esters, chlorinated paraffins, hydrogenated terphenyls, etc.

The formulation can further comprise one or more organic solvents, such as isopropyl alcohol, in an amount ranging from 0 to 15 percent by weight on a basis of total weight of the formulation, preferably less than 15 weight percent and more preferably less than 10 weight percent.

The foregoing sealant or potting formulations preferably are cured at ambient temperature and pressure, however the formulations generally can be cured at a temperature ranging from about 0° C. to about 100° C.

In addition to the foregoing ingredients, polymerizable sealant compositions of the invention can optionally include one or more of the following: pigments; thixotropes; retardants; catalysts; and masking agents.

Useful pigments include those conventional in the art, such as carbon black and metal oxides. Pigments preferably are present in an amount from about 0.1 to about 10 wt % based upon total weight of the formulation.

Thixotropes, for example fumed silica or carbon black, are preferably used in an amount from about 0.1 to about 5 wt % based upon total weight of the formulation.

An additional advantage of sealant formulations according to the invention is their improved curing behavior. The extent of cure of a sealant formulation as a function of time is often difficult to measure directly, but can be estimated by determining the extrusion rate of the composition as a function of time. The extrusion rate is the rate at which a mixed sealant formulation, i.e., a sealant formulation together with an accelerator system, is extruded from an applicator device. As the sealant formulation is mixed with the accelerator system, curing begins, and the extrusion rate changes with time. The extrusion rate thus is inversely related to the extent of cure. When the extent of cure is low, the viscosity of the mixed ungelled sealant formulation is low and thus the extrusion rate is high. When the reaction approaches completion, the viscosity becomes very high, and the extrusion rate thus becomes low. The extrusion rate can be measured according to AMS Method 3276 (section 4.5.10), which is incorporated herein by reference.

Sealant formulations according to the present invention can have, depending on the particular formulation, initial extrusion rates as high as 500 g/min or higher, together with low extrusion rates on the order of about 5 to 10 g/min or less after curing times on the order of one hour.

Another preferred curable sealant formulation combines one or more plasticizers with the ungelled polymer(s), curing agent(s) and filler(s) described above. Use of a plasticizer allows the polymerizable formulation to include ungelled polymers which have higher $T_g$ than would ordinarily be useful in an aerospace sealant or potting compound, i.e., use of a plasticizer effectively reduces the $T_g$ of the formulation, and thus increases the low-temperature flexibility of the cured polymerizable formulation beyond that which would be expected on the basis of the $T_g$ of the ungelled polymers alone.

The compositions of the present invention are useful in aerospace applications such as aerospace sealants and linings for fuel tanks; and as electrical potting or encapsulant compounds. An aerospace sealant material according to the present invention can exhibit properties including high temperature performance, fuel resistance and flexural strength. The formulations detailed herein are well suited for use as potting compounds to encapsulate electrical and electronic components which can experience temperature extremes, chemically harsh environments and mechanical vibrations.

The foregoing description is illustrative of particular embodiments of the invention, but is not meant to be a limitation upon the practice thereof. The following claims, including all equivalents thereof, are intended to define the scope of the invention.

Therefore, we claim:

1. A sealant formulation prepared from components comprising:
    (a) at least one ungelled polymer prepared by reacting reactants comprising at least one polyvinyl ether monomer and at least one polythiol material, the ungelled polymer being terminated with functional groups other than a thiol group;
    (b) at least one curing agent reactive with the functional group of (a); and
    (c) at least one additive selected from the group consisting of fillers, adhesion promoters, plasticizers and catalysts.

2. The sealant formulation of claim 1, wherein said ungelled polymer has a glass transition temperature of less than −50° C.

3. The sealant formulation of claim 1, wherein said ungelled polymer has a viscosity of less than about 500 poise at a temperature of about 25° C. and a pressure of about 760 mm Hg.

4. The sealant formulation of claim 1, wherein said ungelled polymer has a number average molecular weight of between 500 and 20,000.

5. The sealant formulation of claim 4, wherein said ungelled polymer has a number average molecular weight of between 2000 and 5000.

6. The sealant formulation of claim 1, wherein said ungelled polymer comprises 30 to 90 weight percent of the sealant formulation based upon total weight of the components used to prepare the sealant formulation.

7. The sealant formulation of claim 1, wherein said polyvinyl ether monomer is a divinyl ether monomer.

8. The sealant formulation of claim 7, wherein said divinyl ether monomer is selected from the group consisting of: divinyl ether, ethylene glycol divinyl ether, butanediol divinyl ether, hexanediol divinyl ether, diethylene glycol divinyl ether, triethylene glycol divinyl ether, trimethylolpropane trivinyl ether, tetraethylene glycol divinyl ether, cyclohexanedimethanol divinyl ether, polytetrahydrofuryl divinyl ether and mixtures thereof.

9. The sealant formulation of claim 1, wherein said polyvinyl ether monomer is a mixture of components comprising divinyl ether and polyvinyl ether having at least three vinyl groups.

10. The sealant formulation of claim 1, wherein said polyvinyl ether monomer comprises greater than 50 mole percent of the reactants used to prepare said ungelled polymer.

11. The sealant formulation of claim 1, wherein said polyvinyl ether monomer has a pendant group selected from the group consisting of epoxy groups, hydroxyl groups, alkoxy groups and mixtures thereof.

12. The sealant formulation of claim 1, wherein said polythiol material is a dithiol.

13. The sealant formulation of claim 12, wherein said dithiol material is selected from the group consisting of 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dithia-3-methylbutane, dipentenedimercaptan, ethylcyclohexyldithiol, dimercaptodiethylsulfide, methyl-substituted dimercaptodiethylsulfide, dimethyl-substituted dimercaptodiethylsulfide, dimercaptodioxaoctane, 1,5-dithio-3-oxapentane and mixtures thereof.

14. The sealant formulation of claim 1, wherein said polythiol material has a pendant group selected from the group consisting of hydroxyl groups, amino groups, and alkoxy groups.

15. The sealant formulation of claim 1, wherein said polythiol material has a number average molecular weight ranging from 200 to 5000.

16. The sealant formulation of claim 1, wherein said polythiol material comprises less than 50 mole percent of the reactants used to prepare the ungelled polymer.

17. The sealant formulation of claim 1, wherein said ungelled polymer is terminated with at least one reactive functional group which is selected from the group consisting of vinyl groups, hydroxyl groups, amino groups and epoxy groups.

18. The sealant formulation of claim 1, wherein said reactants from which said ungelled polymer are prepared further comprise a catalyst.

19. A sealant formulation prepared from components comprising:
   (a) at least one ungelled polymer prepared by reacting reactants comprising diethylene glycol divinyl ether and dimercapto dioxaoctane, the ungelled polymer being terminated with functional groups other than a thiol group;
   (b) at least one curing agent reactive with the reactive functional group of (a); and
   (c) at least one additive selected from the group consisting of fillers, adhesion promoters, plasticizers and catalysts.

20. An aerospace sealant formulation prepared from components comprising:
   (a) at least one ungelled polymer prepared by reacting reactants comprising at least one polyvinyl ether monomer and at least one polythiol material, the ungelled polymer being terminated with functional groups other than a thiol group;
   (b) at least one curing agent reactive with the reactive functional group of (a); and
   (c) at least one additive selected from the group consisting of fillers, adhesion promoters, plasticizers and catalysts.

21. An electrical potting formulation prepared from components comprising:
   (a) at least one ungelled polymer prepared by reacting reactants comprising at least one polyvinyl ether monomer and at least one polythiol material, the ungelled polymer being terminated with functional groups other than a thiol group;
   (b) at least one curing agent reactive with the reactive functional group of (a); and
   (c) at least one additive selected from the group consisting of fillers, adhesion promoters, plasticizers and catalysts.

* * * * *